July 15, 1958  R. O. MANSPEAKER  2,843,038
BAKERY APPARATUS AND METHOD
Filed Jan. 6, 1954
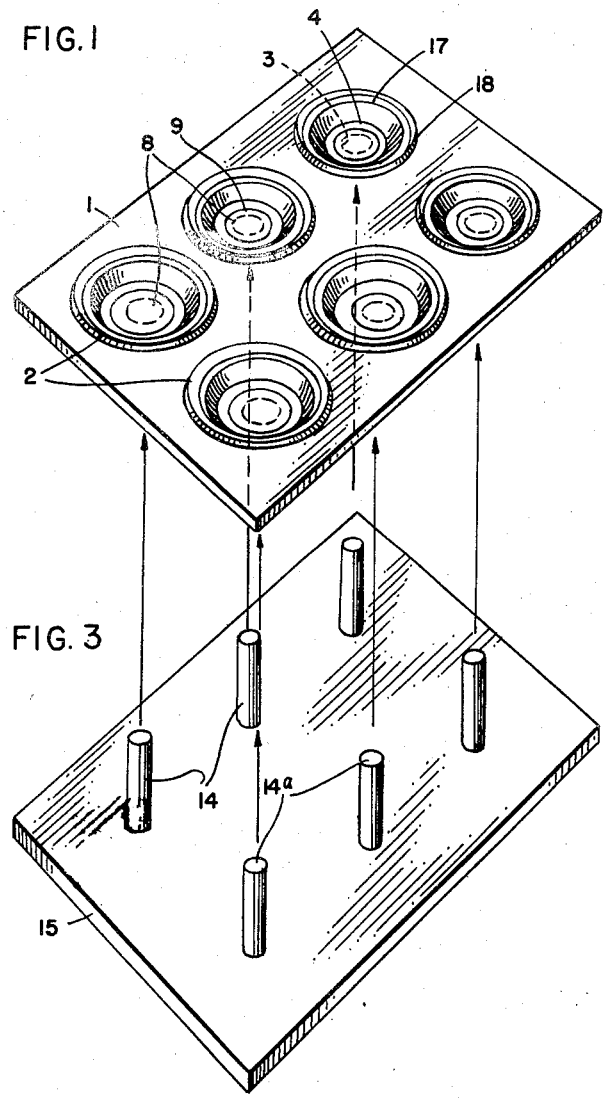
*INVENTOR:*
ROBERT O. MANSPEAKER
ATT'YS

United States Patent Office 2,843,038
Patented July 15, 1958

2,843,038

BAKERY APPARATUS AND METHOD

Robert O. Manspeaker, Memphis, Tenn.

Application January 6, 1954, Serial No. 402,576

2 Claims. (Cl. 99—438)

This invention relates to bakery apparatus, in particular, to a method and apparatus for removing baked goods from a baking utensil.

This application is a continuation-in-part of application Serial No. 273,882, filed February 28, 1952.

It is an object of the invention to provide bakery apparatus which is readily filled with materials to be baked and is adapted for rapid and easy removal of baked goods, particularly in the volume production of commercial bakery operations. The apparatus may be employed for processing various bakery goods such as pies, cakes, tarts, cookies, and other pastry. It is especially advantageous for baked pies, for removing them while hot, without harm and with little or no necessity for handling hot equipment.

Another object is to provide apparatus furnishing uniform baking while including construction for ready ejection of the baked goods.

An additional object is to provide apparatus which preserves the usual contour and continuous surface of the baked goods and precludes sticking and rupture.

It is a further object to provide apparatus adaptable to a variety of goods, in various sizes and shapes.

A still further object is to provide apparatus which requires a minimum number of operations in use.

Another object is to provide apparatus simply and economically constructed yet as effective or more so than much more complicated devices.

Yet another object is to provide a new and improved method for removing or ejecting baked goods in a more rapid and efficient manner.

These and other objects and advantages of the invention will become apparent upon reference to the following description taken in conjunction with the attached drawing, illustrating preferred embodiments of the invention, in which Figure 1 is a top perspective view of a preferred embodiment of a baking unit in accordance with the invention, illustrating a unit having a plurality of mold portions for the goods;

Figure 2 is a plan view of one of the mold portions illustrated in Figure 1, with the base element or disc removed;

Figure 3 is a top perspective view of one arrangement of ejectors according to the invention;

Figures 4-7 are enlarged views in elevation and cross-section of a mold portion of the baking unit of Figures 1 and 2, illustrating the sequence of baking and ejecting operations;

Figure 8 is a fragmentary top perspective view of another embodiment of the invention, illustrating the construction of a mold portion for baking a larger article, wherein three openings are provided in the bottom of the mold; and Figure 9 is a fragmentary top perspective view of an arrangement of ejectors for use with the embodiment of Figure 8.

The invention pertains to bakery apparatus including a baking utensil, a base member for the utensil, and an ejector. The base member is adapted to separate, eject or carry baked goods or foodstuffs from the utensil on applying pressure to the member from outside of the utensil. Pressure is applied to the base member by the ejector, and the member moves outwardly from the utensil carrying the baked goods. The base member contains a magnetic substance, the ejector is magnetizable and means are provided for magnetizing the ejector. When the ejection operation is complete and at the time of removing the baked goods from their ejected location, the ejector is magnetized to hold the base member, so that the goods are separated from the member in the process of removal. The ejector is also preferably magnetized during ejection, to hold the goods steady.

In a preferred embodiment, there is provided a baking utensil having at least one opening, preferably in its bottom, and the base member is in the form of a cover for the opening, serving also to equalize the heat applied to the goods. The ejector is adapted to pass through the opening and move the cover or base member to eject the goods. Preferably, the cover is adapted with the utensil to substantially form a continuation of the inner surface of the utensil, preserving the smoothness and continuity of the inner surface which contacts and molds the goods.

An advantageous combination useful in itself includes a baking utensil having an opening in its bottom, and a cover for the opening or base member adapted to form a continuation of the inner surface as aforesaid, the cover being adapted to move outwardly from the utensil to eject baked goods.

A feature of the invention, useful alike in other baking utensil constructions, is the provision of a cutting edge adapted for cutting material to be baked to conform to the dimensions of the utensil. Dough or other material can be cut to fit the utensil merely by pressing the cutting edge covered by the material against a relatively rigid object, such as a roller or plate.

A method is provided in which goods are ejected from a baking utensil by pressing from without on a movable base member containing a magnetic substance. A magnetizable ejector is pressed against the base member, and the ejector is magnetized at least at the time of removing the goods from their ejected location.

Referring to the drawing, Figure 1 illustrates a baking unit which includes a utensil composed of a body or frame portion 1 and a plurality of pie pan-shaped mold portions 2 each having a circular central opening or hole 3 in its bottom 4. While the drawing illustrates a utensil for baking pies, the mold portions may take different shapes and forms for baking other pastries.

Adjoining and surrounding each of the bottom openings 3 is a circular recess or depression 5 providing an annular ledge or shoulder 6 beneath the inner surface 7 of the bottom 4 of the mold portion 2. A circular plate or disc base member or cover 8 completes the baking unit, and it is positioned in the bottom 4 of the mold portion. It fits closely into the recess 5 and covers the opening 3 with its upper surface 9 lying in one plane with the inner surface 7 of the bottom. Thus, the inner surface of the bottom of the unit is substantially unbroken. As shown, a broad supporting base, or having a considerable surface area, may be provided by the plate 8, the plate also having an appreciably greater area than the contact surface provided by the free end of the ejector, subsequently described. Other sizes, shapes or forms of the bottom 4, the recess 5, the plate 8, and the opening 3 may of course be employed within the purview of the invention.

An embodiment especially suited for large pies and other articles is represented in Figure 8, where a mold 10 having three suitably arranged openings 11 is shown. A single circular plate, not shown, is provided, and it fits in a recess 12 in the bottom 13 of the mold, in the manner of the above-described form of the invention. Separate cover members or plates can be employed for the individual openings, if desired.

The baked goods are ejected from the unit by pressing against magnetizable ejectors such as shown in Figure 3, wherein a bank of rod-shaped ejectors 14 corresponding in number and location to the molds 2 in the utensil is employed, the ejectors being suitably mounted on a support 15. In the form of the invention shown, the ejectors or plungers 14 are cylindrical and constructed to pass approximately centrally through the openings 3 in the molds 2, and they are preferably of the same height or have their free ends 14a lying in the same plane so that the baked articles in one unit may be ejected simultaneously. The ejectors may be constructed for magnetization in one of the various known ways. They may be permanent magnets as shown, or electromagnets suitably constructed and arranged. Figure 9 illustrates an arrangement of ejectors 16 suitable for use with the mold construction of Figure 8.

The pie pan or bowl-shaped molds or forms 2, or 10, shown which serve as receptacles for goods to be baked and the baked goods are preferably constructed so that an annular shoulder or flange 17 is provided in the interior of the mold and adjacent or proximate to the top, to support the edge or rim of a pie. The shoulder may be omitted, for example, where only a single, bottom layer of dough is baked. Adjoining and enclosing the shoulder 17, surrounding the mouth of the pan, is an annular rim or bead 18 which terminates in a narrow or sharp uppermost, upwardly or outwardly extending edge 19 that serves as a cutting edge for a sheet of dough placed thereon. By placing a layer of dough over the utensil and passing a roller over the dough or pressing the utensil and dough against a plate or the like, the dough is cut at the mold edges to the size of the molds, a number of molds thus being filled or covered concurrently or at the same time.

The molds 2, or 10, are spaced from each other on the frame portion 1 to provide at least one-half inch between the cutting edges 19, so that no appreciable amount of compressed dough is formed between the molds. Compressed dough cannot be reworked in a kneader or mixer. The frame and mold baking utensil is desirably constructed of baker's aluminum, and the cover or ejector plate or disc base member contains or is fashioned from a magnetic substance, which will be strongly attracted by a magnet, various steels being satisfactory.

In baking operations with the new apparatus and referring particularly to the embodiment shown in Figures 1 to 7, the baking pan unit is assembled with the cover plates 8 in their positions in the recesses 5 in the bottoms 4 of the molds 2, as shown in Figure 4. Pie dough 20 is then placed in the molds as described above, to provide a filled unit, as shown in Figure 5. Although not illustrated, a suitable fruit or other filling and a top crust can be added. The loaded unit is placed in an oven, the goods are baked, and the hot unit containing the baked goods is removed from the oven.

The unit is then placed over ejectors, such as the ejectors 14 shown in Figure 3, and pushed down to eject the pie crusts or pies, as shown in Figure 6. With the cover plates 8 having substantially greater areas than those of the ejector ends, the pressure applied by the ejectors is distributed to avoid crushing or breaking the goods. In the preferred form shown, the ejectors are magnetized during ejection, so that each article remains in one position relative to its ejector. It will be apparent that the same results can be achieved in other ways; for example, the operation can be carried out mechanically and automatically, the ejectors can be caused to move through stationary baking units, or the ejectors can be caused to eject the baked articles at different times and in any order.

When the baking unit is pushed down or the ejectors elevated as far as desired, the baked articles are removed from their ejected locations or positions, either manually or mechanically, for further processing, storing, packaging or use. If the ejectors 14 include permanent magnets, the cover plates 8 remain behind, on the free or plate-contacting ends 14a of the ejectors, when the articles are removed. If electromagnets are used and are not then activated, they are activated just prior to removing the articles and until they are separated from the cover plates 8. If it were not for this separation of the cover plates, they would in many cases stick to the baked articles and require separate removal, often with damage to the goods. The utensil is then elevated and removed from the ejectors 14, as shown in Figure 7, or the ejectors are caused to descend through the openings 3, and in so doing, the cover plates 8 return to the recesses 5 in the bottoms 4 of the molds.

It will be apparent that the new apparatus is suitable for other similar uses. It may be used effectively where articles are baked in aluminum foil which is intended to enclose the articles individually until consumption. The cover plates 8 provide a broad supporting base and distribute the pressure applied by the ejectors 14, to avoid puncturing the aluminum foil casings. Magnetization serves to prevent scattering and loss of the cover plates and may be employed to steady the goods during ejection.

There is thus provided by the invention an apparatus in which goods are baked and from which they are rapidly and easily ejected in a commercially advantageous manner. Uniform baking and removal without damage result, requiring little or no handling of hot metal. A method is provided for facilitating and speeding up the removal of baked goods from a utensil. The apparatus and method are well-suited for large and small bakeries and are also adapted for home, restaurant and other applications.

The invention claimed is as follows:

1. The combination of a baking utensil having at least one opening in its bottom and a recess in the inner surface of the utensil and adjoining the opening, a cover plate for said opening containing a magnetic substance and adapted to fit in said recess to substantially form a continuation of said inner surface, said cover plate also being adapted to move outwardly from said utensil to eject baked goods from the utensil, and an ejector separate from said cover plate and adapted to pass through said opening and abut said cover plate to eject the goods, said ejector also comprising a magnet.

2. The combination of a pie-baking utensil having a plurality of pie pan-shaped mold portions each having at least one opening in its bottom and a recess in the inner surface of the bottom adjoining and surrounding the opening, a cover plate for each said opening containing a magnetic substance and adapted to fit closely in said recess and cover said opening with the outer surface thereof lying substantially in one plane with said inner surface, said cover plate also being adapted to move outwardly from said bottom to eject baked goods from the mold portion, and a corresponding plurality of ejectors separate from said cover plates and each adapted to pass through one said opening and abut the cover plate thereover to eject the goods, said ejectors being adapted to eject the contents of the several mold portions simultaneously, and each said ejector also comprising a magnet.

References Cited in the file of this patent

UNITED STATES PATENTS

| | | |
|---|---|---|
| 247,576 | Ovens | Sept. 27, 1881 |
| 497,606 | Richardson | May 16, 1893 |
| 896,964 | Williams | Aug. 25, 1908 |
| 1,645,627 | Smith | Oct. 18, 1927 |
| 1,974,443 | Bean | Sept. 25, 1934 |
| 2,021,597 | Frost | Nov. 19, 1935 |
| 2,033,574 | Henderson | Mar. 10, 1936 |
| 2,449,136 | Pattison | Sept. 14, 1948 |
| 2,494,236 | Goldstein | Jan. 10, 1950 |

FOREIGN PATENTS

| | | |
|---|---|---|
| 669,290 | Great Britain | Apr. 2, 1952 |